United States Patent Office

2,794,836

PROCESS FOR PRODUCING NITROACETOPHENONE COMPOUNDS

Harvey D. Troutman, Royal Oak, Mich., assignor to Parke, Davis & Company, Detroit, Mich., a corporation of Michigan No Drawing. Application March 7, 1956, Serial No. 569,964

14 Claims. (Cl. 260—592)

This invention relates to a process for the production of nitroacetophenone compounds. More particularly, the invention relates to a process for the production of p-nitroacetophenone compounds having the formula

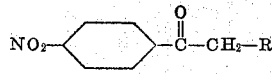

where R is hydrogen or a cyclic imide residue such as a phthalimido, succinimido, maleimido, substituted succinimido or a similar cyclic imido group.

One of the above compounds, p-nitroacetophenone, has recently become a very important industrial chemical. It is the starting material for the most widely used commercial method for producing the antibiotic chloramphenicol by chemical synthetic means. Much of the cost of producing chloramphenicol is directly attributable to the cost of the p-nitroacetophenone starting material which, unfortunately, has to date been higher due to lack of a cheap method of production. A number of methods for producing p-nitroacetophenone have been suggested and tried but all suffer the same disadvantage of low yields and consequently high costs. The most practical of these methods and the one which it is believed is most widely used, involves the oxidation of p-nitroethylbenzene with air. Without an oxidation catalyst, yields of about 30% of the theoretical can be obtained by bubbling air through p-nitroethylbenzene at 135–145° C. for twenty-eight hours (see U. S. Patent No. 2,674,628, issued April 6, 1954). When an oxidation catalyst is employed, the yield obtained is only 10% to 20% of the theoretical. It is apparent that this method not only suffers the disadvantage of low yields but involves the use of relatively high tempertures and the engagement of expensive reaction vessels for prolonged periods of time. Moreover, the reaction is hazardous and the reaction mixture must be fractionally distilled at the end of the reaction in order to separate the desired p-nitroacetophenone from the unchanged starting material and large quantities of impurities. This latter procedure not only requires considerable time to complete but also requires the use of expensive distillation apparatus thus further increasing the cost of production.

The above compounds in which R is a cyclic imide residue, namely the α-imido-p-nitroacetophenones, are of particular use for the preparation of α-amino-p-nitroacetophenone to which they can easily be converted by known hydrolytic methods. α-Amino-p-nitroacetophenone is a very important industrial chemical. The largest use of α-amino-p-acetophenone at the present time is as an intermediate in the production of chloramphenicol. Unfortunately, α-amino-p-nitroacetophenone is quite expensive because so many chemical transformations are necessary to produce it from readily available materials. The best process for producing this material and the one which is now used commercially involves nitrating ethyl benzene to obtain p-nitroethylbenzene, oxidizing the p-nitroethylbenzene so obtained to p-nitroacetophenone, brominating the p-nitroacetophenone to obtain α-bromo-p-nitroacetophenone, reacting the α-bromo-p-nitroacetophenone with hexamethylene tetramine, and finally hydrolyzing the α-bromo-p-nitroacetophenonehexamethylene tetramine complex. From an industrial standpoint it is always important to eliminate as many chemical transformations as possible since this not only decreases the labor costs of the over-all process, but releases plant equipment for further production or the production of other products.

It is an object of the present invention to provide a process for producing p-nitroacetophenone cheaply in high yields by a simple process from readily obtainable and cheap starting materials.

It is also an object of the invention to provide a process for producing p-nitroacetophenone which does not at any stage involve the use of expensive or special equipment or industrially hazardous procedure.

A further object of the invention is to provide a process for producing p-nitroactophenone in a shorter time than possible by the methods now in use.

A still further object of the invention is to provide a process for producing p-nitroacetophenone which employs only mild reaction conditions and yields a product which requires little, if any, further purification.

It is an object of the present invention to provide a process for producing α-imido-p-nitroacetophenones cheaply by a simple process from readily obtainable and cheap starting materials.

In accordance with the invention, the above objects as well as other objects which will become apparent are realized by reacting an α-methyl-p-nitrobenzyl nitrate ester compound having the formula

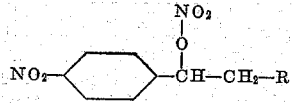

with at least one equivalent of a strongly basic substance to produce the desired p-nitroacetophenone having the formula

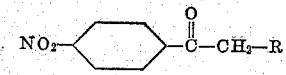

where R has the same significance as given above.

In the production of p-nitroacetophenone itself it is a desirable feature of the invention that the reaction takes place rapidly, in most cases exothermically, to produce very high and, in most instances, almost theoretical yields of the desired p-nitroacetophenone. In carrying out the process it is not necessary that α-methyl-p-nitrobenzyl nitrate used as the starting material be pure. In fact, in practice it is many times preferable to use a starting material which contains some of the ortho isomer, carry out the process and separate the o-isomer impurity during the purification process. For example, one may use the crude product obtained by the nitration of α-chloroethylbenzene or α-methyl phenol carbinol as the starting material. This crude product contains about 60 to 65% of α-methyl-p-nitrobenzyl nitrate, some α-methyl-o-nitrobenzyl nitrate and other unidentified products. When using this crude product in the process, one obtains good yields of p-nitroacetophenone in easily isolable form.

In the production of the α-imido-p-nitroacetophenone compounds of the invention the α-imidomethyl-p-nitrobenzyl nitrate ester compounds used as starting materials can be produced easily by nitration of the corresponding α-imidomethyl benzyl alcohols which in turn can be produced very easily from styrene oxide and the corresponding imides by the method described in German Patent No. 810,028. Thus, the over-all process for producing α-amino-p-nitroacetophenone utilizing as intermediates the α-imido-p-nitroacetophenone compounds of the invention involves four, rather than five, steps or transformations.

In carrying out the reaction between the nitrate ester compound and the strongly basic substance, a wide variety of strongly basic substances can be used and the conditions of the process can be varied considerably. In general, the strongly basic substances which have been found suitable for use in the process of the invention are those having a dissociation constant not less than $10^{-3}$. Among the many types of strongly basic substances which fall in this category are alkali metal hydroxides, alkali metal carbonates, alkali metal oxides, alkali metal alkoxides, alkali metal amides, alkaline earth metal hydroxides, alkaline earth metal oxides, alkaline earth metal alkoxides, alkaline earth metal amides, strongly basic organic tertiary amines, strongly basic organic secondary amines, quaternary ammonium hydroxides or organic tertiary amines, quaternary ammonium carbonates of organic tertiary amines and the like. Some specific examples of the aforementioned strongly basic substances are sodium hydroxide, potassium hydroxide, lithium hydroxide, sodium carbonate, potassium carbonate, sodium oxide, sodium methylate, sodium ethylate, sodium propylate, potassium methylate, potassium ethylate, sodamide, potassium amide, sodium hydride, sodium triphenylmethyl, barium hydroxide, calcium oxide, calcium amide, calcium ethylate, piperidine, 2-n-propyl-piperidine, morpholine, diethylamine, di-n-propylamine, di-n-butylamine, diethanolamine, ethylaminoethanol, dimethylaminoethanol, tetramethylammonium hydroxide, tetraethylammonium hydroxide, benzyltrimethylammonium hydroxide, quaternary ammonium hydroxide and carbonate polystyrene resins and the like.

The process can be carried out either in the presence or absence of an inert organic solvent or diluent. In general, it is preferable to employ a solvent or diluent, especially when the strongly basic substance used is a solid. The nature of the organic solvent is not particularly critical but it should be inert under the reaction conditions and one in which the nitrate ester compound is quite soluble. For this purpose it has been found preferable to employ the lower aliphatic alcohols such as methanol, ethanol, isopropanol, n-propanol, and tert. butanol. Other solvents which can be used include ketones such as acetone, nitriles such as acetonitrile, ethers such as the dimethyl ether of ethylene glycol, amides such as formamide and dimethylformamide, and esters such as ethyl acetate. It is not necessary that the organic solvents used be completely anhydrous but it is preferable that they do not contain more than about 20 to 25% water.

The temperature of the reaction can likewise be varied considerably. The most practical reaction temperatures are those between 10 and 110° C., the preferred reaction temperature being between 25 and 80° C. Temperatures higher than 110° C. can be used but this is not necessary. Similarly, temperatures below 10° C. can also be employed but their use leads to unnecessarily long reaction times.

The time required for the reaction is necessarily dependent to a large extent upon the reaction temperature and the strongly basic substance employed. However, in general, the reaction is usually complete within an hour or slightly more and, in some instances, even within as short a time as fifteen minutes. Longer reaction times can, of course, be used but this is unnecessary.

As mentioned above, at least one equivalent of the strongly basic substance is employed for each equivalent of the nitrate ester compound. Although an excess of the basic substance can be used, if desired, it is preferable to use approximately an equivalent amount or at least not more than about a 15% excess. However, when organic amines such as diethylamine, dimethylaminoethanol, ethylaminoethanol, trimethylamine, piperidine, etc. are used as the basic substance it is preferable to use several equivalents of the amine for each equivalent of the nitrate ester.

The invention is illustrated by the following specific examples.

*Example 1*

21 g. of α-methyl-p-nitrobenzyl nitrate is added in small portions with stirring to 50 cc. of piperidine dissolved in 50 cc. of ethanol (95%) at 20° C. The solid α-methyl-p-nitrobenzyl nitrate dissolves rapidly to give a brown solution and the temperature of the mixture gradually rises to 47–48° C. without external application of heat. The mixture is cooled with a water bath to keep the temperature from rising above 50° C. until there is no longer any spontaneous increase in temperature. The mixture is warmed to 60° C. for a few minutes, cooled and poured into 800 cc. of water. The solid p-nitroacetophenone so produced is collected, washed with water, then with water containing a small amount of hydrochloric acid, then again with water and finally dried; yield 15 g. or 91% of the theoretical; M. P. 78–80° C.

If desired, the product can be recrystallized from ethanol (95%) containing a drop or two of hydrochloric acid; yield 13.9 g. (M. P. 78–80° C.) plus 0.7 g. of semisolid material.

*Example 2*

21.2 g. of α-methyl-p-nitrobenzyl nitrate in 150 cc. of methanol is added with stirring to a solution of 65 g. of potassium hydroxide in 150 cc. of methanol at 25° C. The mixture gradually turns red in color and the temperature rises to about 40° C. When the temperature of the reaction mixture begins to fall, the mixture is heated to a temperature of 52–53° C. for a few minutes, cooled and poured into two liters of water. The solid p-nitroacetophenone is collected, washed with water and dried; yield 14.5 g. or 88%; M. P. 76–80° C.

If desired, the product can be purified further by recrystallization from 95% ethanol; yield 11 g. of M. P. 79–80° C. plus 2.5 g. of M. P. 78–80° C.

*Example 3*

15 g. of freshly powdered potassium carbonate is added along with 75 cc. of methanol to a rapidly stirred solution of 21.2 g. of α-methyl-p-nitrobenzyl nitrate in 175 cc. of methanol at room temperature. Within about ten minutes the temperature rises to 36° C. As soon as the reaction temperature begins to decrease, the mixture is heated at 55 to 65° C. for one hour, and cooled and poured into water. The solid p-nitroacetophenone so produced is collected, washed with water and dried; yield 15 g. or 91%; M. P. 75–78° C.

If desired, the product can be purified by recrystallization from 20 cc. of ethanol to obtain 15 g. of p-nitroacetophenone melting at 78–80° C.

*Example 4*

A solution of 0.6 g. of sodium methoxide in 20 cc. of ethanol (95%) is added in small portions with stirring to a solution of 2.1 g. of α-methyl-p-nitrobenzyl nitrate in 20 cc. of ethanol (95%). The reaction mixture changes to a dark blue or purple and some solid separates. When heat is no longer evolved the reaction mixture is heated to 55° C. for a few minutes, cooled and poured into 200 cc. of water. The solid p-nitroacetophenone is collected, washed with water containing a little hydrochloric acid and recrystallized from 10 cc. of ethanol (95%) containing a few drops of acetic acid to obtain a first crop of 0.87 g.; M. P. 79–80° C. and a second crop of 0.25 g.; total yield 1.12 g. or 70%.

Example 5

2.1 g. of α-methyl-p-nitrobenzyl nitrate is added in small portions to 20 cc. of piperidine with stirring keeping the temperature between 43–45° C. by regulating the rate of addition. After the addition has been completed and the temperature has dropped to 35° C. the mixture is poured into 200 cc. of water containing an excess of hydrochloric acid. The solid p-nitroacetophenone is collected, washed with water and dried; yield 1.35 g. of 82%; M. P. 78.5–80° C.

Example 6

6 g. of a 35% solution of benzyltrimethylammonium hydroxide in methanol is added in portions with stirring at 30–40° C. to a solution of 2.1 g. of α-methyl-p-nitrobenzyl nitrate in 15 cc. of ethanol. The dark colored solution is poured into 150 cc. of water containing an excess of hydrochloric acid, the p-nitroacetophenone collected, washed with water and dried; yield 1.5 g. or 91% of the theoretical; M. P. 76–78° C.

Example 7

A solution consisting of 2.1 g. of α-methyl-p-nitrobenzyl nitrate, 5 cc. of di-n-butylamine and 20 cc. of ethanol is boiled gently for thirty minutes and then poured into a solution composed of 150 cc. of water and 10 cc. of hydrochloric acid (sp. gr. 1.18). The p-nitroacetophenone which separates is collected, washed with water and recrystallized from 6 cc. of ethanol; M. P. 79–80° C.; yield of pure product on first crop—1 g. or 60.6%.

Example 8

A solution containing 2.1 g. of α-methyl-p-nitrobenzyl nitrate, 5 cc. of morpholine and 20 cc. of ethanol is boiled gently for one hour and then poured into a solution composed of 150 cc. of water and 10 cc. of hydrochloric acid (sp. gr. 1.18). The p-nitroacetophenone which separates is collected, washed with water and dried; M. P. 79–80° C.; yield 1.4 g. or 85%.

Example 9

A solution consisting of 2.1 g. of α-methyl-p-nitrobenzyl nitrate, 5 cc. of diethanolamine and 20 cc. of ethanol is boiled gently for one hour and then poured into a solution composed of 150 cc. of water and 10 cc. of hydrochloric acid (sp. gr. 1.18). The solid p-nitroacetophenone is collected, washed with water and dried; M. P. 78–80° C.; yield 1.36 g. or 83%.

Example 10

A solution consisting of 2.1 g. of α-methyl-p-nitrobenzyl nitrate, 5 cc. of di-n-propylamine and 15 cc. of ethanol is boiled gently for one-half hour and then poured into a solution composed of 150 cc. of water and 10 cc. of hydrochloric acid (sp. gr. 1.18). The solid p-nitroacetophenone is collected, washed with water and dried; M. P. 77–80° C.; yield 1.3 g. or 79%.

If desired, the product can be recrystallized from 4 cc. of 95% ethanol; M. P. 78–80° C.

Example 11

A solution consisting of 2.1 g. of α-methyl-p-nitrobenzyl nitrate, 5 cc. of diethylamine and 15 cc. of methanol is heated under reflux for one hour. The mixture is concentrated on a steam bath and then poured into water containing a little hydrochloric acid. The solid p-nitroacetophenone is collected and recrystallized from 95% ethanol; M. P. 78–80° C.; yield 1.45 g. or 88%.

Example 12

100 cc. of a quaternary ammonium chloride polystyrene resin sold under the trade name of "Dowex 2" is placed in a column, washed with water, then with 10% aqueous potassium hydroxide solution, then again with water, then with 10% aqueous potassium carbonate solution, again with water and finally with methanol. This procedure produces the quaternary ammonium carbonate of the "Dowex 2."

(a) A mixture consisting of 5 g. of the quaternary ammonium carbonate polystyrene resin prepared as described above, 2.1 g. of α-methyl-p-nitrobenzyl nitrate and 25 cc. of methanol is heated at 50–60° C. for one hour with stirring. The resin is removed by filtration, washed with methanol and the filtrate combined with the reaction mixture filtrate. The combined methanol filtrates are evaporated to dryness and the residual p-nitroacetophenone recrystallized from ethanol; M. P. 78–80° C.; yield 1.3 g. or 79%.

If desired, the resin can be treated with dilute hydrochloric acid to regenerate the original "Dowex 2" which can be converted to the carbonate as described above and used again in the process.

(b) A warm (50° C.) solution of 2.1 g. of α-methyl-p-nitrobenzyl nitrate in 150 cc. of methanol is poured through a 50 cc. column containing quaternary ammonium carbonate polystyrene resin prepared as described above. The effluent is warmed and passed through the column once or twice more. The column is washed with 500 cc. of warm methanol, the effluents combined and evaporated to obtain the desired p-nitroacetophenone; yield 1 g. or 61%; M. P. 78–80° C.

Example 13

10 g. of freshly powdered barium hydroxide crystals $(Ba(OH)_2 \cdot 8H_2O)$ is added to a rapidly stirred solution of 10.6 g. of α-methyl-p-nitrobenzyl nitrate in 100 cc. of ethanol. The suspension is stirred for fifteen hours at 30° C. and finally for two hours at 50° C. The solid is collected and washed with 75 cc. of ethanol. The ethanol solutions are poured into water. The yellow solid p-nitroacetophenone so produced is collected, washed with water and dried; yield 7.5 g. or 91% of the theoretical; M. P. 78–80° C.

Example 14

10.6 g. of α-methyl-p-nitrobenzyl nitrate is added in small portions to a solution of 3 g. of sodium hydroxide in 150 cc. of methanol. A red solution is formed and the temperature slowly rises to 45° C. When the temperature of the mixture falls to 35° C. the reaction mixture is poured into water containing an excess of hydrochloric acid. The yellow solid p-nitroacetophenone is collected, washed with water and dried; yield 7.3 g. or 88% of the theoretical; M. P. 78–80° C.

Example 15

2.1 g. of α-methyl-p-nitrobenzyl nitrate is added to a mixture composed of 5 cc. of piperidine and 10 cc. of tertiary butanol at 30° C. The temperature of the solution slowly rises to 48–50° C. When the temperature falls to 35° C. the mixture is poured into water. The solid is collected, washed with water containing a small amount of hydrochloric acid, then with water and finally dried to give 1.5 g. or 91% of the theoretical of p-nitroacetophenone; M. P. 75–77° C.

Example 16

2.1 g. of α-methyl-p-nitrobenzyl nitrate is added to 10 cc. of morpholine. The temperature rises to 40° C. When the temperature of the solution falls to 32° C. the solution is poured into water. The solid p-nitroacetophenone is collected, washed with dilute hydrochloric acid, then with water and finally dried; yield 1.2 g. or 73%; M. P. 78–80° C.

Example 17

5 cc. of piperidine is added to a solution of 2.1 g. of α-methyl-p-nitrobenzyl nitrate in 10 cc. of acetonitrile. A red solution forms, and the temperature of the mixture rises to 52–53° C. without external application of heat. When the temperature falls to 35° C. the mixture is poured into cold dilute hydrochloric acid. The yellow solid p-nitroacetophenone is collected, washed with water and finally dried; yield 1.3 g. or 79%; M. P. 79–80° C.

Example 18

5 cc. of piperidine is added to a solution of 2.1 g. of α-methyl-p-nitrobenzyl nitrate in 10 cc. of acetone. The temperature of the red solution increases to 52–53° C. without external application of heat. When the temperature of the mixture falls to 33° C. the mixture is poured into cold water containing an excess of hydrochloric acid. The solid p-nitroacetophenone so produced is collected, washed with water and dried; yield 1.3 g. or 80% of the theoretical; M. P. 78–80° C.

Example 19

A solution of 2.1 g. of α-methyl-p-nitrobenzyl nitrate, 5 cc. of N-phenyl-piperazine and 15 cc. of ethanol is boiled gently for thirty minutes and then poured into a solution composed of 150 cc. of water and 10 cc. of hydrochloric acid (sp. gr. 1.18). The solid p-nitro acetophenone which separates is collected, washed with water and recrystallized from 4 cc. of ethanol; M. P. 78–80° C.; yield 1.4 g. or 85%.

Example 20

A solution of 2.1 g. of α-methyl-p-nitrobenzyl nitrate, 2 g. of 2,5-dimethyl-piperazine and 20 cc. of ethanol is boiled gently for one hour and then poured into a solution composed of 150 cc. of water and 10 cc. of hydrochloric acid (sp. gr. 1.18). The solid p-nitroacetophenone which separates is collected, washed with water and dried; yield 1.3 g. or 79%; M. P. 77–79° C.

Example 21

A solution of 2.1 g. of α-methyl-p-nitrobenzyl nitrate, 3 cc. of diethylenetriamine and 20 cc. of ethanol is boiled gently for thirty minutes and then poured into a solution composed of 150 cc. of water and 10 cc. of hydrochloric acid (sp. gr. 1.18). The solid p-nitroacetophenone which separates is collected, washed with water and finally dried; yield 1.1 g. or 67% of the theoretical; M. P. 76–78° C.

Example 22

A solution of 2.1 g. of α-methyl-p-nitrobenzyl nitrate, 2 cc. of pyrrolidine and 20 cc. of ethanol is boiled gently for fifteen minutes and then poured into a solution composed of 150 cc. of water and 10 cc. of hydrochloric acid (sp. gr. 1.18). The solid p-nitroacetophenone which separates is collected, washed with water and finally dried; yield 1.25 g. or 76% of the theoretical; M. P. 77–79° C.

Example 23

2.1 g. of α-methyl-p-nitrobenzyl nitrate is added to a solution of 5 cc. of piperidine and 5 cc. of methyl cellosolve. A red solution forms, and the temperature rises to 60° C. without external application of heat. When the temperature falls to 35° C. the mixture is poured into a solution composed of 150 cc. of water and 10 cc. of hydrochloric acid (sp. gr. 1.18). The yellow solid p-nitroacetophenone which separates is collected, washed with water and finally dried; yield 1.33 g. or 81%; M. P. 78–80° C.

Example 24

To a solution of 2.1 g. of α-methyl-p-nitrobenzyl nitrate in N,N-dimethyl formamide is added 5cc. of piperidine. The solution becomes red and the temperature rises to 55° C. without external application of heat. The mixture is cooled with a water bath to keep the temperature from rising above 55° C. until there is no longer any spontaneous increase in temperature. The mixture is warmed at 55° C. for a few minutes, cooled and poured into a solution composed of 150 cc. of water and 20 cc. of hydrochloric acid (sp. gr. 1.18). The yellow solid p-nitroacetophenone so produced is collected, washed with water and dried; yield 1.2 g. or 73%; M. P. 77–79° C.

Example 25

5 cc. of piperidine is added to a suspension of 2.1 g. of α-methyl-p-nitrobenzyl nitrate in formamide. A red solution is formed and the temperature rises to 50° C. without external application of heat. The mixture is cooled with a water bath to keep the temperature from rising above 50° C. until there is no longer any spontaneous increase in temperature. When the temperature falls to 35° C., the mixture is poured into a solution composed of 150 cc. of water and 20 cc. of hydrochloric acid (sp. gr. 1.18). The yellow solid p-nitroacetophenone is collected, washed with water and dried; yield 1.35 g. or 82%; M. P. 78–79° C.

Example 26

To a solution of 2.1 g. of α-methyl-p-nitrobenzyl nitrate in 10 cc. of dioxane is added 5 cc. of piperidine. A red solution is formed, and the temperature rises to 50° C. without external application of heat. When the temperature of the mixture falls to 35° C. the mixture is poured into a solution composed of 150 cc. of water and 20 cc. of hydrochloric acid (sp. gr. 1.18). The pale brown p-nitroacetophenone is collected; washed with water and dried; yield 1.2 g. or 73%; M. P. 78–80° C.

Example 27

2.1 g. of α-methyl-p-nitrobenzyl nitrate is added in portions with stirring to 20 cc. of di-n-butylamine. The solid α-methyl-p-nitrobenzyl nitrate dissolves rapidly to give a yellow solution which slowly changes to reddish-brown while the temperature slowly rises from 25° C. to 35° C. After two hours, the solution is poured into cold water containing an excess of hydrochloric acid. The solid p-nitroacetophenone is collected, washed with water and dried; yield 1.43 g. or 87%; M. P. 76–79° C.

Example 28

48,762 grams of the crude nitration product obtained by nitration of methyl phenyl carbinol with fuming nitric acid at −20 to −30° C. (contains about 60% α-methyl-p-nitrobenzyl nitrate) is dissolved in 53 liters of methanol. 15,422 grams of potassium hydroxide in 64.3 liters of methanol is added slowly to the solution of the α-methyl-p-nitrobenzyl nitrate keeping the temperature below 30° C. The mixture is stirred at 30° C. for one hour and then two volumes of water and 90,720 grams of crushed ice are added. The pH of the solution is adjusted to 6.5 to 7 with hydrochloric acid and the p-nitroacetophenone separated by centrifugation. The crude wet product is slurried with 9.5 liters of methanol, the mixture centrifuged and the solid washed with 1.9 liters of methanol. The p-nitroacetophenone is then dried at 43° C.; yield 20,270 grams; M. P. about 75–80° C. The percentage yield is 53% assuming that the crude product used as starting material was pure α-methyl-p-nitrobenzyl nitrate or 81.3% assuming that the crude product only contained 60% of the nitrate ester.

The α-methyl-p-nitrobenzyl nitrate used as the starting material can be produced cheaply and in good yield by the nitration of α-chloroethylbenzene using the method described at page 679 in the Journal of the Chemical Society for 1946. This substance can also be prepared cheaply in good yield by the nitration of methyl phenyl carbinol using the following procedure:

770 g. of phenyl methyl carbinol is added with stirring to 3000 ml. of cold (−20° C.) fuming nitric acid keeping the temperature at −20° C. to −27° C. by the addition of Dry Ice. After the addition has been completed the mixture is stirred for ten minutes and then quenched with 10 liters of ice water. The oily product is separated and washed once with water; yield 1248 grams. This material can, if desired, be used in the production of p-nitroacetophenone as described in Example 28. Alternatively, the α-methyl-p-nitrobenzyl nitrate can be isolated from the crude oily nitration product in crystalline form by allowing the oily product to stand in a refrigerator for forty-eight hours at 4° C. The crystalline mass is crushed and centrifuged to obtain the crystalline α-methyl-p-nitrobenzyl nitrate. From 4,563 grams of crude nitration product one obtains 2,580 grams of crystalline material.

*Example 29*

(a) A mixture consisting of 300 g. of styrene oxide and 177 g. of phthalimide is stirred and heated at 155–170° C. for six hours. The mixture is cooled to 50–70° C., 200 ml. of benzene added and the mixture allowed to stand at room temperature for sixteen hours. The crude α-phthalimidomethyl-benzyl alcohol is collected, washed with 500 ml. of benzene and dried; yield 190 g. If desired, the product can be recrystallized from isopropanol; M. P. 162–164° C.

12.5 g. of α-phthalimidomethyl-benzyl alcohol is added in small portions with stirring to 100 ml. of fuming nitric acid (sp. gr. 1.5) at −25° C. During the addition the temperature is kept at −20 to −30° C. by the addition of Dry Ice. After the addition has been completed the mixture is stirred for one-half hour at −20° and then allowed to warm to 0° C. The reaction mixture is added slowly to 800 ml. of ice and water, the solid collected and washed with water. The solid product is washed with ethanol, then digested with two 500 ml. portions of boiling methanol and finally dried; yield 15.2 g. If desired, the crude α-phthalimidomethyl-p-nitrobenzyl nitrate may be recrystallized from glacial acetic acid, but this is not necessary. The recrystallized material melts at 170–190° C. with decomposition and evolves gas at 190°–200° C.

1.8 g. of crude α-phthalimidomethyl-p-nitrobenzyl nitrate is added to 15 ml. of dimethylformamide and 5 ml. of piperidine. The temperature rises to 45–50° C. and the solution turns dark. When the temperature falls to 35° C., the mixture is poured into 200 ml. of ice and water containing 10 ml. of hydrochloric acid (sp. gr. 1.18) and the solid collected. The product is washed with water, dissolved in hot glacial acetic acid and the solution cooled. The crystalline α-phthalimido-p-nitroacetophenone is collected and dried; yield 0.95 g.; 220–230° C. The product when pure melts at 236–237° C. This material can be hydrolyzed to α-amino-p-nitroacetophenone by heating it first with alkali and then with sulfuric acid in the usual manner for hydrolyzing phthalimides.

(b) 3.6 g. of crude α-phthalimidomethyl-p-nitrobenzyl nitrate (prepared as described above) is added to 5 ml. of piperidine and 35 ml. of dioxane. The temperature rises to about 39–40° C. during the addition. The mixture is allowed to cool slightly, and then heated at 50–60° C. for fifteen minutes. The mixture is poured into 400 ml. of water containing 10 ml. of hydrochloric acid (sp. gr. 1.18) and the gummy solid which separates collected. The product is washed with water and recrystallized from glacial acetic acid to obtain 0.75 g. of α-phthalimido-p-nitroacetophenone melting at 230–235° C.

(c) 10.7 g. of crude α-phthalimidomethyl-p-nitrobenzyl nitrate (prepared as described above) is added slowly to 6 g. of potassium carbonate in 200 ml. of methanol at 55–60° C., and the mixture refluxed for one hour. The mixture is cooled, poured into 1500 ml. of water containing 20 ml. of hydrochloric acid (sp. gr. 1.18) and the product collected, washed with water and dried; yield 5.5 g. Recrystallization from glacial acetic acid yields α-phthalimido-p-nitroacetophenone; M. P. 228–235° C.

*Example 30*

A mixture consisting of 99 g. of succinimide, 240 g. of styrene oxide and 360 ml. of dimethylformamide is heated under reflux for sixteen hours and then 300 ml. of the reaction mixture removed by vacuum distillation. The residue is taken up in six liters of chloroform, and the chloroform extract washed with water and then with 1.5 liters of 0.2 N potassium hydroxide solution. The extract is dried and the solution concentrated to a volume of 900 ml. The residue is diluted with 1350 ml. of cyclohexane and the α-succinimidomethyl benzyl alcohol which precipitates is collected; yield 90 g. The product can be purified by recrystallization from benzene; M. P. 155–157° C.

9 g. of α-succinimidomethyl benzyl alcohol is added in small portions with stirring to 90 ml. of fuming nitric acid (sp. gr. 1.5) keeping the temperature at −30° C. The mixture is stirred at −30° C. for one-half hour, then at −10° C. for one-half hour and finally at 0° C. for one-half hour. The mixture is poured into one liter of ice and water, and the white solid which separates is collected, washed well with water and dried; yield 9 g. If desired, the crude α-succinimidomethyl-p-nitrobenzyl nitrate can be purified by recrystallization from 95% ethanol; M. P. 136–139° C.

3.96 g. of crude α-succinimidomethyl-p-nitrobenzyl nitrate and 20 ml. of methanol are added to 2.2 g. of potassium carbonate and 50 ml. of methanol. The mixture is stirred and heated at 45–55° C. for one hour, cooled and poured into 250 ml. of water containing 5 ml. of hydrochloric acid (sp. gr. 1.18). The gummy product which separates is collected, washed with water and recrystallized from absolute ethanol to obtain the desired α-succinimido-p-nitroacetophenone; M. P. 125–145° C.; yield 2.1 g.

By using maleimide in the above procedure instead of succinimide one obtains α-maleimido-p-nitroacetophenone.

This application is a continuation-in-part of my co-pending applications Serial Nos. 466,238 and 466,239, filed November 1, 1954, now abandoned.

I claim:

1. Process for the production of p-nitroacetophenone compounds which comprises reacting an α-methyl-p-nitrobenzyl nitrate ester compound having the formula,

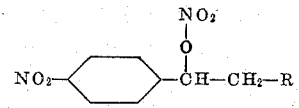

with at least one equivalent of a strongly basic substance; where R is a member of the group consisting of hydrogen and cyclic imide radicals.

2. Process for the production of p-nitroacetophenone compounds which comprises reacting an α-methyl-p-nitrobenzyl nitrate ester compound having the formula,

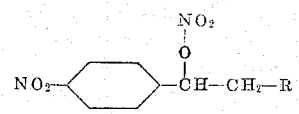

at a temperature between 10 and 110° C. with at least one equivalent of a basic substance having a dissociation constant not less than $10^{-3}$; where R is a member of the group consisting of hydrogen and cyclic imide radicals.

3. Process for the production of p-nitroacetophenone which comprises reacting α-methyl-p-nitrobenzyl nitrate with at least one equivalent of a basic substance having a dissociation constant not less than $10^{-3}$, at a temperature between 10 and 110° C.

4. Process for the production of p-nitroacetophenone which comprises reacting α-methyl-p-nitrobenzyl nitrate with at least one equivalent of an alkali metal carbonate at a temperature between 10 and 110° C. in the presence of an inert organic solvent containing less than 25% water.

5. Process for the production of p-nitroacetophenone which comprises reacting α-methyl-p-nitrobenzyl nitrate with approximately one equivalent of an alkali metal carbonate at a temperature between 25 and 80° C. in a lower aliphatic alcohol containing less than 25% water.

6. Process for the production of p-nitroacetophenone which comprises reacting α-methyl-p-nitrobenzyl nitrate with approximately one equivalent of a potassium carbonate at a temperature between 25 and 80° C. in a lower aliphatic alcohol containing less than 25% water.

7. Process for the production of p-nitroacetophenone which comprises reacting α-methyl-p-nitrobenzyl nitrate with at least one equivalent of an alkali metal hydroxide at a temperature between 10 and 110° C. in the presence of an inert organic solvent containing less than 25% water.

8. Process for the production of p-nitroacetophenone which comprises reacting α-methyl-p-nitrobenzyl nitrate with approximately one equivalent of an alkali metal hydroxide at a temperature between 25 and 80° C. in a lower aliphatic alcohol containing less than 25% water.

9. Process for the production of p-nitroacetophenone which comprises reacting α-methyl-p-nitrobenzyl nitrate with approximately one equivalent of a potassium hydroxide at a temperature between 25 and 80° C. in a lower aliphatic alcohol containing less than 25% water.

10. Process for the production of p-nitroacetophenone which comprises reacting at a temperature between 10 and 110° C. α-methyl-p-nitrobenzyl nitrate with at least one equivalent of a secondary amine having a dissociation constant of not less than $10^{-3}$.

11. Process for the production of p-nitroacetophenone which comprises reacting at a temperature between 10 and 110° C. α-methyl-p-nitrobenzyl nitrate with at least one equivalent of a secondary amine having a dissociation constant of not less than $10^{-3}$ in the presence of an inert organic solvent containing less than 25% water.

12. Process for the production of p-nitroacetophenone which comprises reacting α-methyl-p-nitrobenzyl nitrate with at least one equivalent of piperidine at a temperature between 25 and 80° C. in the presence of an inert organic solvent containing less than 25% water.

13. Process for the production of p-nitroacetophenone which comprises reacting α-methyl-p-nitrobenzyl nitrate with at least one equivalent of morpholine at a temperature between 25 and 80° C. in the presence of an inert organic solvent containing less than 25% water.

14. Process for the production of p-nitroacetophenone which comprises reacting α-methyl-p-nitrobenzyl nitrate with at least one equivalent of diethanolamine at a temperature between 25 and 80° C. in the presence of an inert organic solvent containing less than 25% water.

References Cited in the file of this patent

Neff: Annalen der Chemie, Band 309, p. 175 (1899–1900).